United States Patent [19]
November

[11] 3,906,198
[45] Sept. 16, 1975

[54] NET WEIGHT OIL COMPUTER OR THE LIKE

[75] Inventor: Milton H. November, Hacienda Heights, Calif.

[73] Assignee: International Telephone and Telegraph Corporation, New York, N.Y.

[22] Filed: Oct. 11, 1974

[21] Appl. No.: 514,222

[52] U.S. Cl............ 235/151.35; 73/32 A; 73/61.1 R
[51] Int. Cl.² ....................... G06G 7/75; G01F 1/00
[58] Field of Search ............ 73/32 A, 61.1 R, 194 B; 235/151.35

[56] References Cited
UNITED STATES PATENTS
3,385,108   5/1968   Rosso................................. 73/194 R
3,774,448   11/1973  Gass et al......................... 73/61.1 R

*Primary Examiner*—Eugene G. Botz
*Attorney, Agent, or Firm*—A. Donald Stolzy

[57] ABSTRACT

A net weight oil computer including a vibration densitometer and a turbine flowmeter. The flowmeter produces output pulses at a frequency directly proportional to the rate of volume flow through a pipeline. The output of the flowmeter is impressed upon the pole of a single pole, double throw electronic switch. One switch contact is connected to an indicator through a divider, a driver amplifier and a counter. The other contact is also connected to an indicator through a divider, a driver amplifier and a counter. The switch is operated by a gate generator connected from the densitometer. The gate generator produces an output pulse of a pulse width directly proportional to the reciprocal of the percent, by weight, of oil or water in the pipeline or some function thereof. A temperature probe is inserted in the line to vary the pulse width or time between pulses in accordance with oil temperature.

18 Claims, 6 Drawing Figures

NET WEIGHT OIL COMPUTER OR THE LIKE

BACKGROUND OF THE INVENTION

This invention relates to devices for determining the character of fluids, and more particularly, to apparatus for producing signals in accordance with the mass of a fluid.

In the past, it has been unknown to measure the percent, by weight, of oil in a mixture of oil and water flowing in a pipeline.

SUMMARY OF THE INVENTION

In accordance with the systems of the present invention, the abovedescribed and other difficulties are overcome by providing a net weight oil computer.

An outstanding feature of the invention is that oil and water mass or weight can be indicated. This is important because the heating capacity of a volume of oil varies with temperature but is independent of the weight or mass thereof. Thus, for billing, blending or mixing purposes a net weight oil computer is extremely important.

The above-described and other advantages of the present invention will be better understood from the following detailed description when considered in connection with the accompanying drawings.

BRIEF DESCRIPTION OF THE DRAWINGS

In the drawings which are to be regarded as merely illustrative.

DESCRIPTION OF THE PREFERRED EMBODIMENTS

THE NET WEIGHT OIL COMPUTER OF FIG. 1

Figure 1:
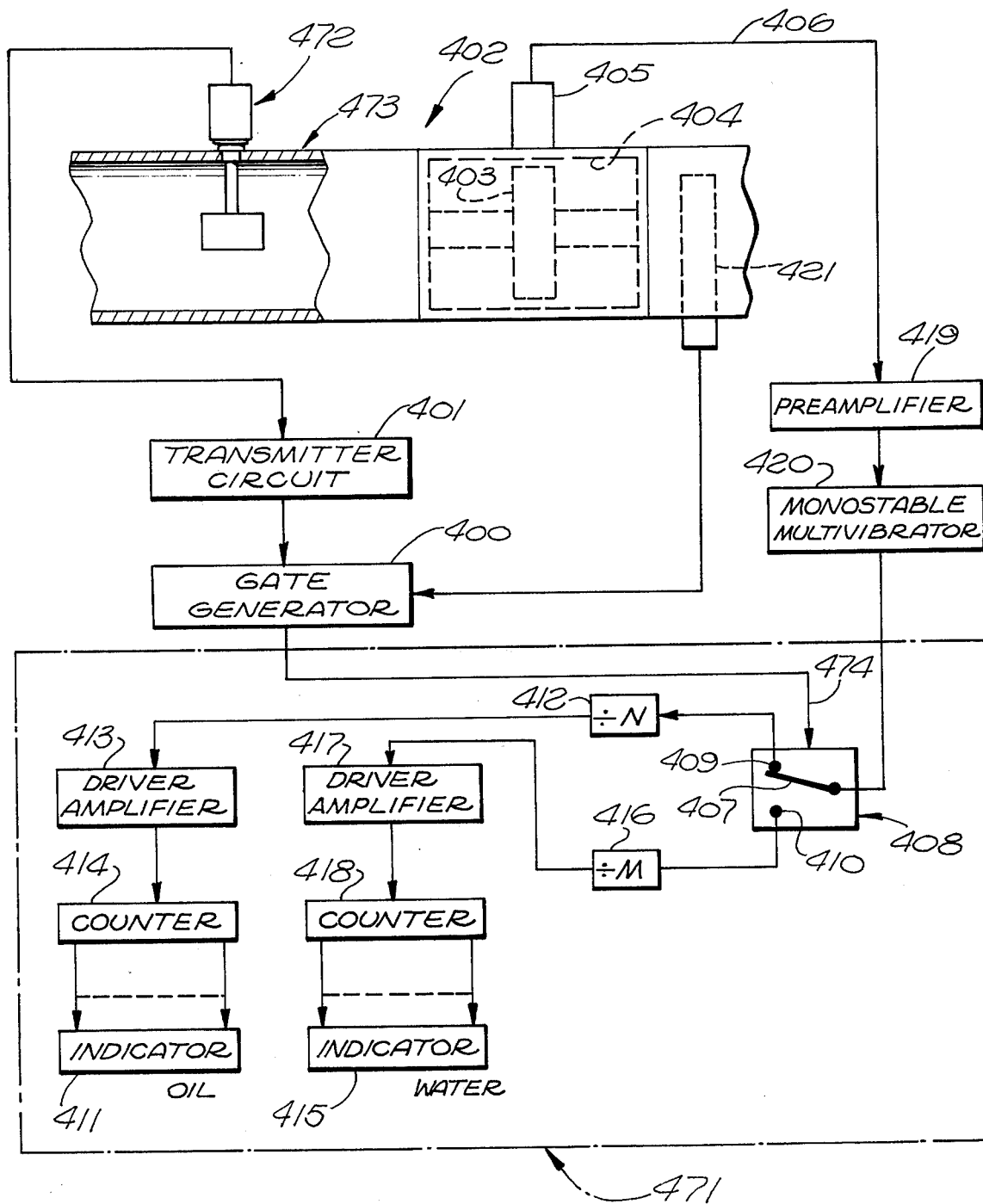
FIG. 1 is a diagrammatic view of the net oil compputer of the present invention.

A net wieght oil computer constructed in accordance with the present invention is shown in FIG. 1. This computer has components mounted in a pipeline 473. One component is a densitometer probe 472 having its output connected to a transmitter circuit 401. The probe 472 and the transmitter circuit 401 form a densitometer which may be identical to or different from that disclosed in copending application Ser. No. 187,948 now U.S. Pat. No. 3,525,917 filed Oct. 12, 1971, by Gerald L. Schlatter and Charles E. Miller for Fluid Sensing Systems. By this reference hereto, the entire contents of said copending application Ser. No. 187,948 is hereby incorporated herein herat. The said copending application Ser. No. 187,948 is assigned to the assignee of the instant application.

Circuit 401 produces an output current which is directly proportional to the density of the mixture of water and oil in pipeline 473.

In FIG. 1, the net weight oil computer also includes a turbine flowmeter 402 which has a turbine bladed rotor 403 and a stator 404. Flowmeter 402 also has a magnetic pickup 405. Flowmeter 402 is entirely conventional and produces a pulse train on an output lead 406. The pulse repetition frequency (PRF) of the pulses on lead 406 is directly proportional to the volume flow rate within pipeline 473. In other words, the flow rate is the rate of volume flow of both oil and water combined, that is the mixture thereof. The output of flowmeter 402 is impressed on the pole 407 of a conventional electronic switch 408 in an output circuit 471. Switch 408 May, however, be a relay, an electronic switch or otherwise. Switch 408 has contacts 409 and 410. Contact 409 is connected to a conventional indicater 411 via a conventional divider 412, a conventional driver amplifier 413 and a conventional counter 414. Contact 410 is connected to a conventional indicator 415 through a conventional divider 416, a conventional driver amplifier 417 and a conventional counter 418.

Flowmeter 402 is connected to switch pole 407 through a conventional preamplifier 419 and a conventional monostable multivibrator 420.

Switch 408 is operated by a gate generator 400 that receives input signals from transmitter circuit 401 and a temperature probe 421. Densitometer probe 472, turbine rotor 403 and temperature probe 421 are all immersed in the mixture of oil and water flowing in pipeline 473.

Dividers 412 and 416 may be employed to cause indicators 411 and 415 to read directly in pounds of oil and pounds of water, respectively.

If the output pulses of gate generator 400 are positive, as described hereinafter, pole 407 will engage one of the contacts 409 and 410. That is, the engagement occurs during the width of the pulse. Conversely, during the time between pulses, pole 407 will engage the other of the contacts 409 and 410.

Figure 2:
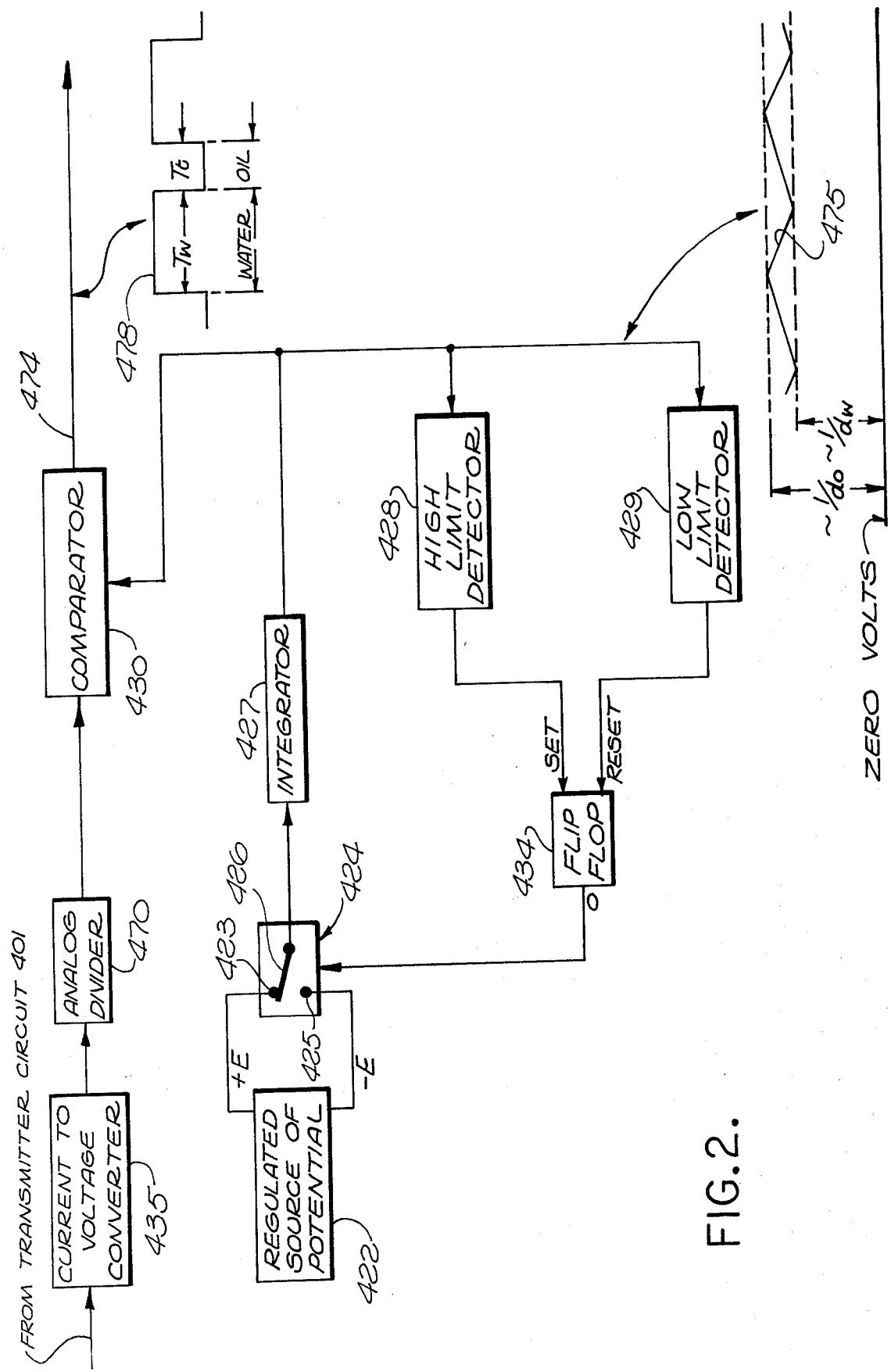
FIG. 2 is a diagrammatic view of a gate generator shown in FIG. 1.

Gate generator 400 is shown in FIG. 2 including a conventional regulated source of potential 422 which places a voltage —E on a contact 423 of a conventional electronic switch 424. Source 422 also places a voltage —E on a contact 425. Switch 424 is a single-pole, double-throw switch having a pole 426. Switch 424 may be a relay, an electronic switch or otherwise. A conventional integrator 427 is connected from the pole of switch 424 to a high limit detector 428, a low limit detector 429 and a conventional comparator 430. The output of comparator 430 is impressed upon switch 408 shown in FIG. 1 over a lead 474.

If desired, all of the structures shown in FIG. 1 may or may not be identical to the corresponding structures disclosed in said copending application Ser. No. 187,948 except gate generator 400. Detectors 428 and 429 are connected, respectively, to the set and reset inputs of a conventional flip-flop 434. The 0 output of flip-flop 434 operates switch 424.

High limit detector 428 causes the output of integrator 427 to decline after a predetermined high level is reached. Conversely, low limit detector 429 causes the output of integrator 427 to increase once a predetermined low level is reached. Thus, the output of the integrator 427 is a triangular wave indicated at 475, the peaks of which are the predetermined high limit and the valleys of which are the predetermined low limit. Thus, when the 0 output of flip-flop 434 is high, switch pole 426 is in engagement with contact 423. Conversely, when the 0 output of flip-flop 434 is low, pole 426 is in engagement with contact 425.

The output of circuit 401 in FIG. 1 is a current analog of density. Circuit 401 may or may not be identical to the corresponding circuit in said copending application Ser. No. 187,948. Converter 435 converts the current analog to a voltage analog. The output of converter 435 is impressed upon comparator 430 through a conventional analog divider 470. Limit detectors are shown in both of FIGS. 3 and 4. The detector of FIG. 3 may be one of the high and low limit detectors 428 and 429, respectively, shown in FIG. 2. FIG. 4 is then the other of the high and low limit detectors 428 and 429, respectively.

Figure 3:
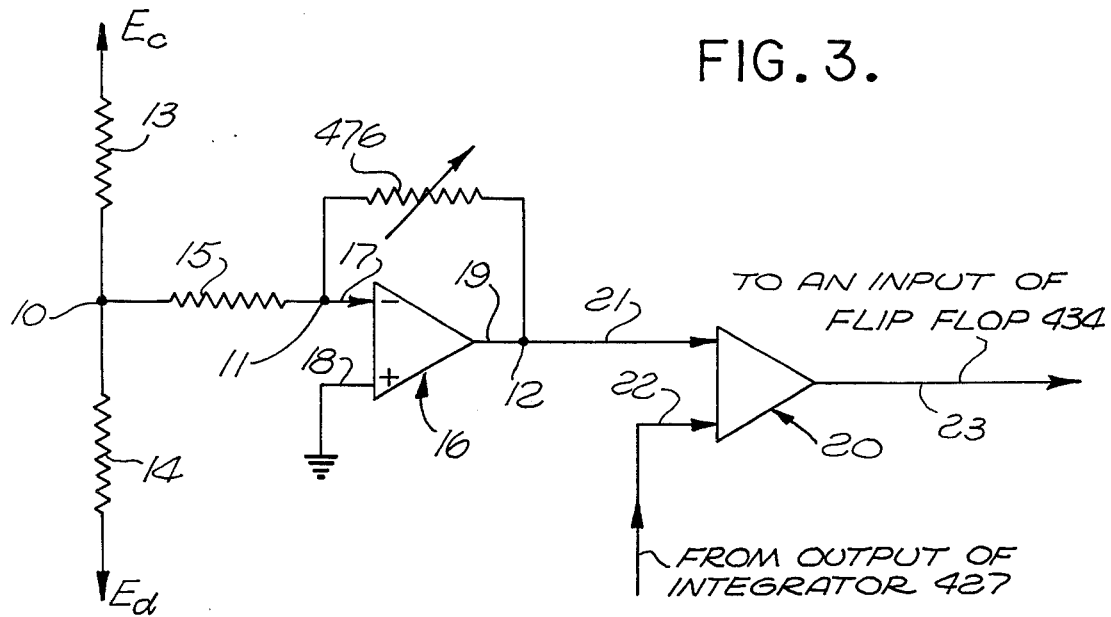
FIG. 3 is a schematic diagram of one of high and low limit detectors shown in FIG. 2.
Figure 4:
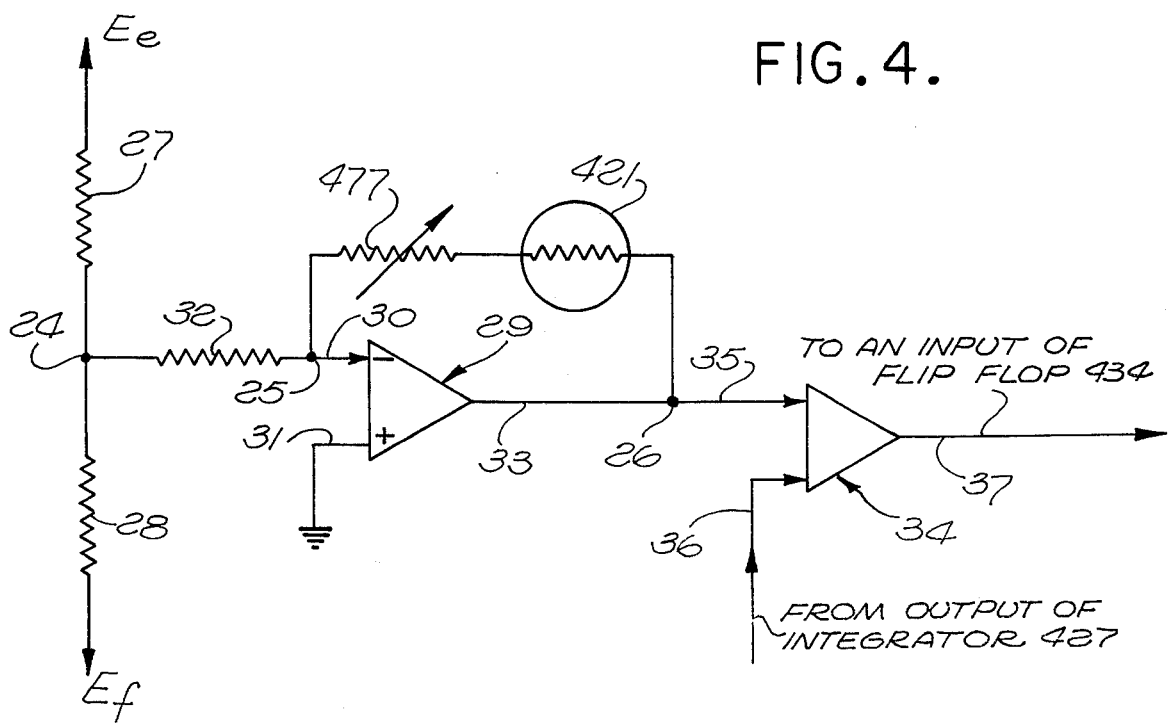
FIG. 4 is a schematic diagram of the other of the high and low limit detectors shown in FIG. 2.

In FIGS. 3 and 4, variable resistors 476 and 477, respectively, are adjusted in accordance with the densities of the water and oil, respectively, in pipeline 473. The water and oil densities are obtained by taking a sample of the mixture thereof in pipeline 473, and then putting the sample through a centrifuge. The densities of the oil and water so separated is then measured. The variable resistors 476 and 477 are then set in proportion to the respective water and oil densities measured. Various densities may be encountered due to impurities, dissolved solids and otherwise. The specific gravity of the water in pipeline 473 might typically be 1.07. The oil in pipeline 473, which may or may not be crude oil, may have a typical specific gravity of .85.

Comparator 430, shown in FIG. 2, produces an output pulse at 478 of a time width equal to the time that the triangular wave output of integrator 427 exceeds the magnitude of the voltage at the output of analog divider 470. Although it is unobvious and quite unexpected, the width of the output pulses of comparator 430 is either directly proportional to the percent, by weight, of water flowing in pipeline 473 or is directly proportional to the percent, by weight, of oil flowing in pipeline 473 depending upon whether the water density $d_w$ is larger than the oil density $d_o$, or vice versa, and depending upon which embodiment of the present invention is employed or which modification thereof is employed. The same is true of the time between pulses.

Temperature probe 421 supplies a correction because the density of oil varies enough with temperature that a noticeable improvement in accuracy can be obtained by using this temperature correction. A temperature correction for changes in the water density is frequently unnecessary.

In FIG. 3, junctions are provided at 10, 11 and 12. A resistor 13 is connected from junction 10 to a potential $E_c$. A resistor 14 is connected from junction 10 to a potential $E_d$, which may be ground. Resistors 13 and 14 form a voltage divider establishing a potential at junction 10 which is added to a feedback potential established by resistor 476 connected between junctions 11 and 12. It will be noted that a portion of the circuit of FIG. 3 is a conventional analog divider. A resistor 15 is connected between junctions 10 and 11.

A differential amplifier 16 is also shown in FIG. 3 having an inverting input lead 17 connected from junction 11, and a non-inverting input lead 18 connected to ground. Differential amplifier 16 has an output lead 19 connected to junction 12.

A second differential amplifier is provided at 20 in FIG. 3 having first and second input leads 21 and 22, respectively. Input lead 21 is connected from junction 12. Input lead 22 is connected from the output of integrator 427 illustrated in FIG. 2.

Differential amplifier 20 has an output lead 23 which is connected to one of the input leads of flip flop 434.

The arrangement of FIG. 4 is not considerably different from the arrangement of FIG. 2. In FIG. 4, junctions are provided at 24, 25 and 26. A resistor 27 is connected from junction 24 to potential $E_e$. Another resistor 28 is connected from junction 24 to potential $E_f$, or ground. As before, resistors 27 and 28 form a voltage divider establishing a potential at junction 24.

In FIG. 4, again, a first differential amplifier 29 forms a part of an analog divider. Differential amplifier 29 has an inverting input lead 30 connected from junction 25, and a non-inverting input lead 31 connected to ground. An adding resistor 32 is connected between junctions 24 and 25.

In FIG. 4, variable resistor 477 and the thermistor or temperature probe 421 are connected in succession in that order in series from junction 25 to junction 26.

Differential amplifier 29 has an output lead 33 connected to junction 26.

In FIG. 4, a second differential amplifier is provided at 34 having first and second input leads 35 and 36. Input lead 35 is connected from junction 26. Input lead 36 is connected from the output of integrator 427 shown in FIG. 2. Differential amplifier 34 has an output lead 37 which is connected to one of the input leads to flip flop 434 shown in FIG. 2.

It will be noted that, thus far, it has not been stated which of the two leads 21 and 22 shown in FIG. 3 are the inverting and non-inverting input leads of differential amplifier 20. The same is true of the input leads 35 and 36 of the differential amplifier 34 shown in FIG. 4. The reason for this is that the water density is set in accordance with variable resistor 476 in FIG. 3, and the oil density is set in accordance with resistor 477 shown in FIG. 4, and the water density may or may not exceed the oil density. This means that the high limit detector 428 shown in FIG. 2 may be either the detector shown in FIG. 3 or the detector shown in FIG. 4. This also means that the low limit detector 429 shown in FIG. 2 may be either the detector shown in FIG. 3 or the detector shown in FIG. 4. Nevertheless, if the high limit detector 428 is the detector of FIG. 4, the low limit detector 429 must be the detector of FIG. 3, and vice versa.

Should the water density exceed the oil density, the detector of FIG. 3 is the low limit detector 429, and the output lead 23 of differential amplifier 20 is connected to the reset input of flip flop 434. When this is the case, the output lead 37 of differential amplifier 34 shown in FIG. 4 is thus then connected to the set input of the flip flop 434 shown in FIG. 2. At the same time, the lead 21 of differential amplifier 20 shown in FIG. 3 is the inverting input lead of differential amplifier 20, and the lead 22 is the non-inverting input lead thereof. While all the foregoing connections are made, the lead 35 of differential amplifier 34 shown in FIG. 4 is the non-inverting input lead thereof, and lead 36 is the inverting input lead thereof.

When the oil density exceeds the water density, the detector of FIG. 3 becomes the high limit detector 428 and output lead 23 of FIG. 3 is then connected to the set input of flip flop 434. Similarly, the output lead 37 in FIG. 4 is connected to the reset input of flip flop 434, and the detector of FIG. 4 is the low limit detector 429. Under all these conditions then, other connections are similarly reversed, i.e. lead 21 of differential amplifier 20 becomes the non-inverting input lead thereof, input lead 22 thereof becomes the inverting input lead thereof, lead 35 in FIG. 4 becomes the inverting input lead of differential amplifier 34, and lead 36 of differential amplifier 34 in FIG. 4 becomes the non-inverting input lead of differential amplifier 34.

When the water density is larger than the oil density, $T_w$ is the width of the pulses 478 as shown in FIG. 2, and $T_t$ is the time between pulse 478 as shown in FIG. 2. However, if nothing is changed but resistors 476 and 477 in FIGS. 3 and 4, respectively, $T_w$ becomes the time between pulses 478, and $T_t$ becomes the width of the pulses 478. This reversal occurs when a reversal occurs between the high and low limit detectors 428 and 429 wherein the detectors of FIGS. 3 and 4 are reversed therein as aforesaid.

The term $T_w$, when the water density is larger than the oil density, is equal to the width of the pulses 478 and is directly proportional to the percent water flowing in pipeline 473 shown in FIG. 1. At the same time, the term $T_t$ is directly proportional to the percent oil flowing in the pipeline 473 shown in FIG. 1.

The embodiment of FIGS. 1 to 4, inclusive, is not perfectly accurate, but in many cases is extremely accurate and may be accurate for all practical purposes. The embodiment of FIGS. 1 to 4, inclusive, is extremely accurate when the percent change in the oil density with temperature is extremely small over the time period which is equal to the sum of $T_w$ and $T_t$.

The output of integrator 427 is illustrated by the triangular waveform 475 shown in FIG. 2. The dimensions $1/d_w$ and $1/d_o$ are the reciprocals of water and oil densities and are directly proportional to, or vice versa, the voltage amplitude dimensions of the high and low limits when the water density is larger than the oil density. In this case, the subscripts $w$ and $o$ would be reversed if the oil density exceeded the water density.

In FIG. 2, the slope of triangular waveform 475 is either positive or negative, but its absolute value in either case is a constant. The integrator 427 is thus only free running in that it rises to the high limit and falls to the low limit. For all practical purposes, it is unnecessary to compensate for temperature expansion and contraction of the water. The term $d_w$ is therefore always constant after resistor 476 has been properly set to the measured value of the water density. If desired, resistors 476 and 477 may be potentiometers operated by a knob having indicia thereon for correlation with a fixed indexed mark.

The temperature of the mixture flowing in pipeline 473 shown in FIG. 1 may vary little the resistance of the probe 421 shown in FIGS. 1 and 4. Should the temperature of the mixture of the oil and water flowing in pipeline 473 shown in FIG. 1 vary greatly, the embodiment of the present invention shown in FIGS. 1 to 4, inclusive, still may be employed so long as the temperature does not vary at a rapid rate.

Figure 5:
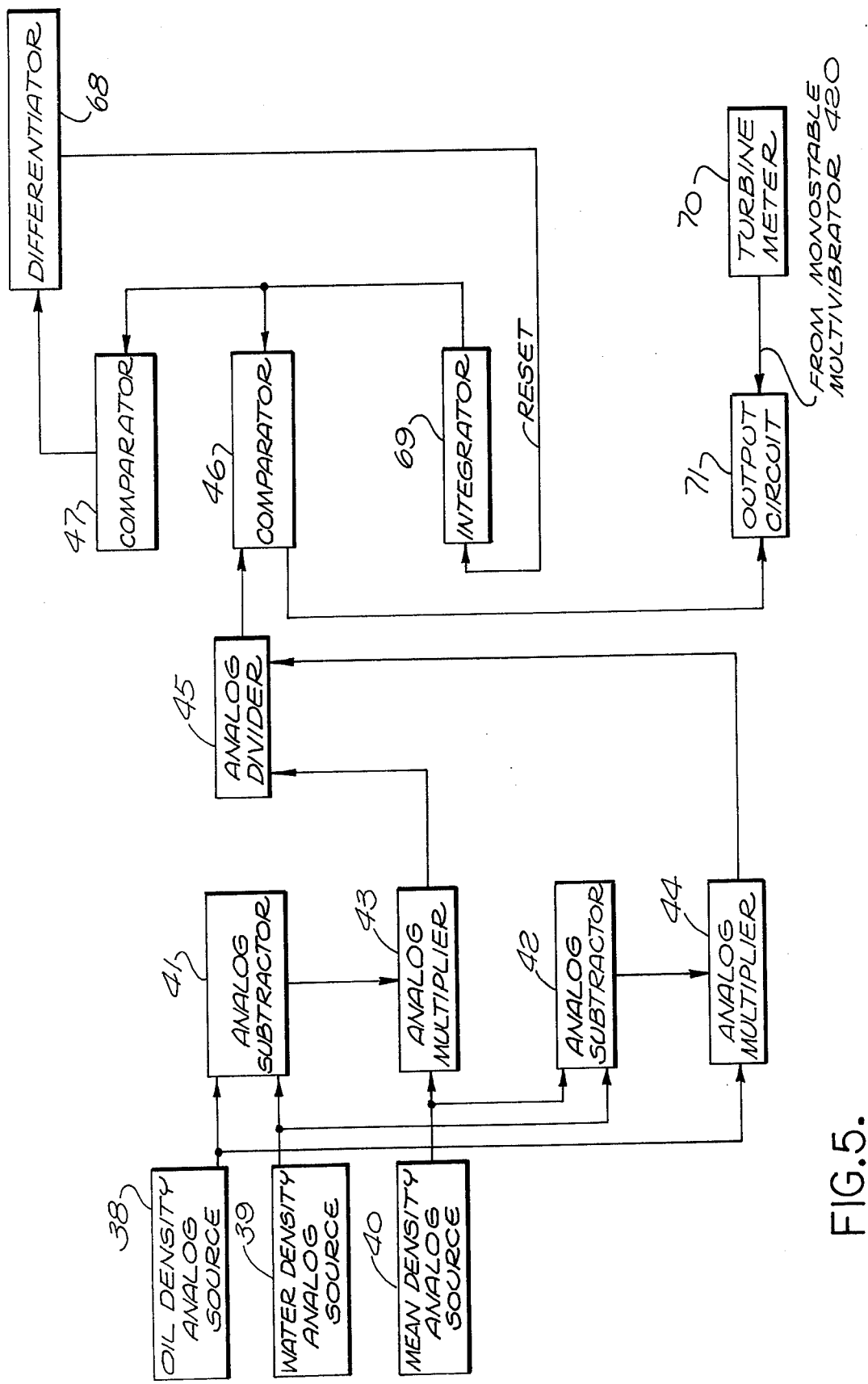
FIG. 5 is a first alternative embodiment of the net weight oil computer of the present invention.
Figure 6:
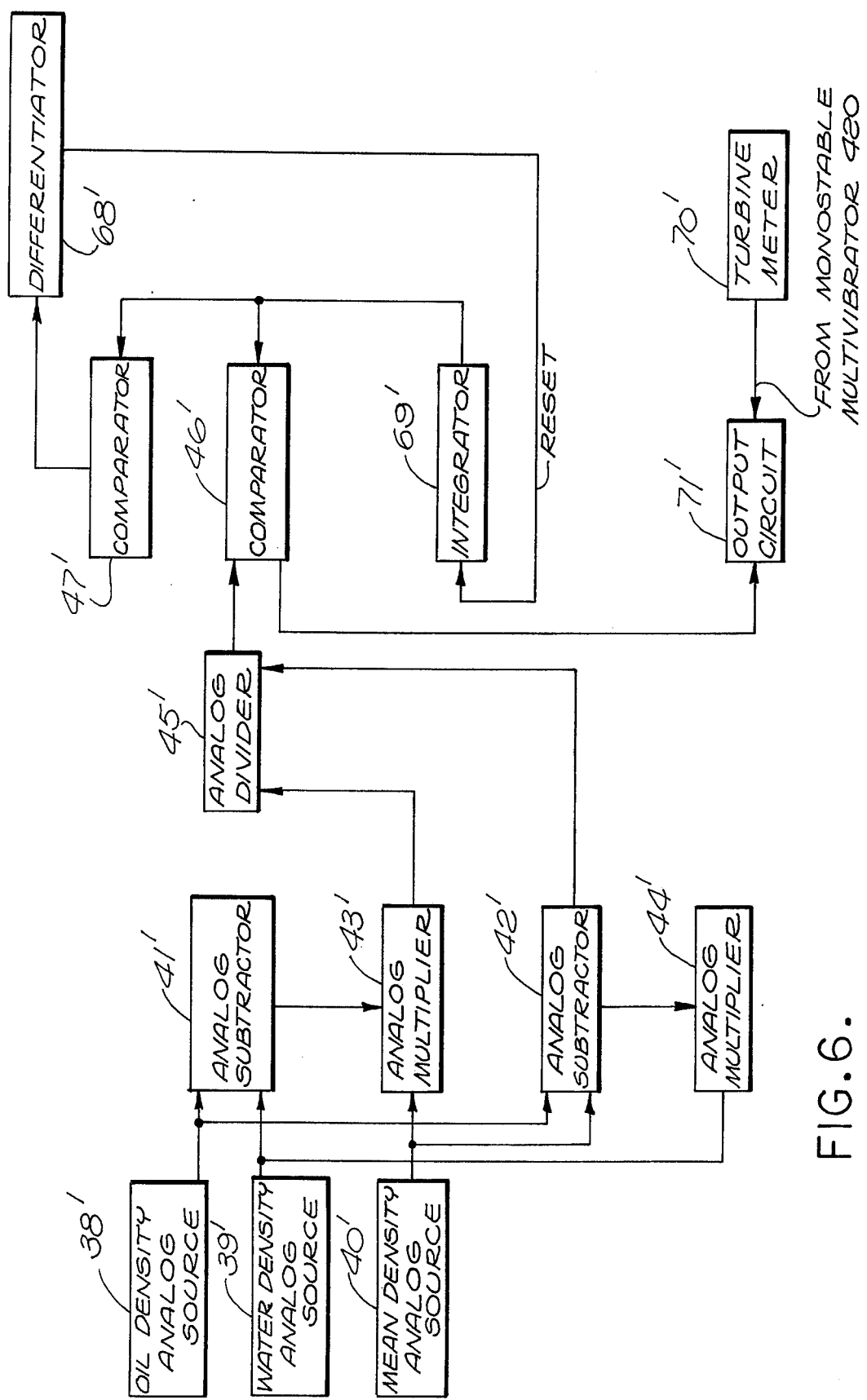
FIG. 6 is a second alternative embodiment of the net weight oil computer of the present invention.

In the embodiments of the present invention illustrated in FIGS. 5 and 6, the outputs thereof are accurate independent of the rate of change of the temperature of the oil and water mixture flowing in the pipeline 473 shown in FIG. 1 with respect to time.

In FIG. 2, the output of analog divider 470 is directly proportional to the reciprocal of $d_m$, mean density. When the triangular waveform 475 exceeds the output of analog divider 470, pulses 478 are produced. The term $T_t$ is thus determined when waveform 475 falls below the output of analog divider 470.

In FIG. 3, all of the structure except differential amplifier 20 actually supplies at junction 12 and over lead 21 a D.C. voltage directly proportional to the reciprocal of water density.

In FIG. 4, all the structure therein except the differential amplifier 34 actually supplies at junction 26 and over lead 35 a D.C. voltage directly proportional to the reciprocal of the oil density.

In accordance with the present invention, one embodiment thereof is disclosed herein in FIGS. 1 to 4 inclusive, a second in FIG. 5, and a third in FIG. 6. Each of these three embodiments compute the percent, by weight, of oil and/or water in a different way, and by unexpected and unobvious equations. These equations follow.

If $d_w > d_o$, switch 408 in FIG. 1 is constructed to have its pole 407 in engagement with contact 409 between pulses 478 in FIG. 2, and pole 407 engages contact 410 during the widths of pulses 478, the detector of FIG. 3 is connected as the low limit detector 429 and the detector of FIG. 4 is connected as the high limit detector 428.

In accordance with the foregoing, the high limit is directly proportional to the reciprocal of $d_o$ and the low limit is directly proportional to the reciprocal of $d_w$. The output of analog divider 470 is directly proportional to the reciprocal of the average density $d_m$ of the mixture of oil and water in pipeline 473.

In the foregoing case, the width $T_w$ of a pulse 478 is directly proportional to percent by weight of water and the time between pulses $T_t$ is directly proportional to percent by weight of oil. By using an inverter at the output of comparator 430 the converse would be true. Thus, one of the times $T_w$ and $T_t$ is always equal to $$K_1 \left( \frac{1}{d_m} - \frac{1}{d_w} \right) \qquad (1)$$

($T_t$ in the case just described) where $K_1$ is a constant that is positive when $d_w > d_o$ (the case just described) and is negative when $d_o > d_w$ (a case not described) where operation of switch 408 is reversed, the detector of FIG. 3 is the high limit detector, and the detector of FIG. 4 is the low limit detector.

The other of the times $T_w$ and $T_t$ is then $$K_1 \left( \frac{1}{d_o} - \frac{1}{d_m} \right) \qquad (2)$$

In the embodiments of FIGS. 5 and 6 the comparator input to the output circuit is similar to the train of pulses 478 in FIG. 2 except that one of the times $T_w$ and $T_t$ is $$\left( K_2 \right) \left( \frac{d_o}{d_m} \right) \left( \frac{d_w - d_m}{d_w - d_o} \right) \qquad (3)$$

where $K_2$ is a positive constant, and the other of the times $T_w$ and $T_t$ is $$\left( K_2 \right) \left( \frac{d_w}{d_m} \right) \left( \frac{d_m - d_o}{d_w - d_o} \right) \qquad (4)$$

Also in the embodiments of FIGS. 5 and 6, one of the times $T_w$ and $T_t$ may be $$\left(K_2\right)\left(\frac{d_o}{d_m}\right)\left(\frac{d_m-d_w}{d_o-d_w}\right) \quad (5)$$

while the other of the times $T_w$ and $T_t$ is $$\left(K_2\right)\left(\frac{d_w}{d_m}\right)\left(\frac{d_o-d_m}{d_o-d_w}\right) \quad (6)$$

OPERATION OF THE NET WEIGHT OIL COMPUTER OF FIG. 1

In the operation of the embodiment of the invention illustrated in FIG. 1, densitometer probe 472 in combination with transmitter circuit 401 delivers a current to gate generator 400 which is directly proportional to the mixture of oil and water flowing in pipeline 473. Gate generator 400 then produces output pulses of widths which are directly proportional to the percent, by weight, of oil flowing in pipeline 473. Temperature probe 421 supplies an input to gate generator 400 to adjust the output in accordance with changes in the temperature of the oil flowing in pipeline 473, this temperature being the same as the temperature of the mixture of oil and water flowing in pipeline 473. Switch 408 in output circuit 471 is constructed to deliver pulses to counters 414 and 418 through driver amplifiers 413 and 417, respectively, and dividers 412 and 416, respectively, so that indicators 411 and 415, respectively, will indicate the total mass of oil and water, respectively, which has passed through that portion of pipeline 43 shown in FIG. 1.

Gate generator 400 controls the position of the pole 407 of switch 408 via lead 474 to divert, alternately, pulses received from the output of monostable multivibrator 420 connected to pole 407 to dividers 412 and 416.

Note will be taken that all of the four outputs of transmitter 401 in FIG. 1, current-to-voltage converter 435 in FIG. 2, and the means density analog sources illustrated in both FIGS. 5 and 6 are directly proportional to the mean, i.e. average density of the mixture of oil and water in pipeline 473 shown in FIG. 1. These same said four outputs are also directly proportional to the mean specific gravity of the mixture, the difference between density and specific gravity only being due to the constant factor of the density of pure water at a constant reference temperature. Thus, for use herein and in the claims, any form of the phrase "specific gravity" is hereby defined to include "density" and vice versa.

Note will be taken that the water in pipeline 473 will not normally be pure and may contain sodium chloride and/or other contaminants in or out of solution.

THE NET WEIGHT OIL COMPUTER OF FIG. 5

In FIG. 5, oil density, water density and mean density analog sources are illustrated at 38, 39 and 40. Two analog subtractors 41 and 42 are illustrated with two analog multipliers 43 and 44. An analog divider is provided at 45. Two comparators are provided at 46 and 47. A differentiator is provided at 68. An integrator is provided at 69. A turbine meter is provided at 70. An output circuit is provided at 71.

Analog subtractor 41 receives inputs from sources 38 and 39. Multiplier 43 receives inputs from the output of analog subtractor 41 and the output of source 40.

Analog subtractor 42 receives inputs from sources 39 and 40, and impresses an output upon analog multiplier 44. Analog multiplier 44 receives another input from the output of analog subtractor 42.

The outputs of multipliers 43 and 44 are impressed upon analog divider 45.

The output of analog divider 45 is impressed upon a comparator 46. The output of comparator 46 is impressed upon output circuit 71. Both comparators 46 and 47 receive inputs from the output of integrator 69. The output of comparator 47 is impressed upon the reset input of integrator 69 via differentiator 68.

The output of turbine meter 70 is impressed upon output circuit 71.

Source 38 may be identical to FIG. 4 without the input from integrator 427 and without differential amplifier 34 and its leads 35, 36 and 37. The output of source 38 would then be taken from junction 26 shown in FIG. 4.

Similarly, source 39 may be identical to FIG. 3 except for the input from integrator 427 which would be omitted with differential amplifier 20 and its leads 21, 22 and 23. The output of source 39 would then be taken from the junction 12 shown in FIG. 3.

Source 40 may be probe 472 and transmitter circuit 401 shown in FIG. 1 with converter 435, but without analog divider 470.

Subtractors 41 and 42 may be entirely conventional. The same is true of multipliers 43 and 44, and divider 45. The same is also true of comparators 46 and 47, differentiator 68 and integrator 69. Turbine meter 70 may be all the structure indicated at 402, 419 and 420 in FIG. 1.

Output circuit 71 may be identical to output circuit 471 shown in FIG. 1, if desired.

The embodiment of the present invention illustrated in FIG. 5 computes oil and water in percent by weight and applies it to output circuit 71 from the output lead of comparator 46 in accordance with one of the expressions (3) and (5). The output of analog divider 45 is directly proportional to one of the expressions (3) or (5). Comparator 46 and integrator 69 simply convert the analog output of analog divider 45 to a pulse width or to a time between pulses. Comparator 46 may, for example, produce an output and impress the same upon output circuit 71 when the output of integrator 69 rises to the level of the amplitude of the output of analog divider 45 or falls to the amplitude of such output.

Comparator 47 resets integrator 69 after a time which is directly proportional to $K_2$. This is true because the sum of the expressions (3) and (4) is equal to $K_2$. Similarly, the sum of the expressions (5) and (6) is equal to $K_2$.

In the embodiment of the present invention illustrated in FIG. 6, the component parts there shown at 38', 39', 40', 41', 43', 42', 44', 45', 47', 46', 69', 71', 68' and 70' may be identical to respective corresponding parts 38, 39, 40, 41, 43, 42, 44, 45, 47, 46, 69, 71, 68 and 70 shown in FIG. 5. FIG. 6 is identical to FIG. 5 except for the connections from sources 38', 39' and 40' to subtractors 41' and 42', and to multipliers 43' and 44'. The operation of both FIGS. 5 and 6 is thus common except for the inputs used. As connected, FIG. 6 computes percent, by weight, of both oil and water in accordance with either one of the expressions (4) or (6). The output of analog divider 45' is thus directly proportional to the expression (4) or the expression (6).

The phrase "utilization means" is hereby defined for use herein and for use in the claims to mean any means for utilizing the outputs of all three of the embodiments of the present invention disclosed herein. For example, the output from switch contact 409 in FIG. 1 is useful independent of the output from switch contact 410. Moreover, the output from switch contact 409 and/or the output from switch contact 410 may be impressed on indicators 411 and 415 as shown, on a process controller or otherwise.

The word "fluid" as used herein and as used in the claims is hereby defined to mean either a gas or a liquid unless the invention is operable only with a liquid.

The computations made herein are by no means limited to computations made by analog computers. The invention as disclosed and claimed herein may also be practiced through the use of digital computers.

The phrase "change the connection of a switch" is hereby defined for use herein and for use in the claims to mean to open or close the switch.

As is conventional, the dimension $T_w$ shown in FIG. 2 precisely as shown and not otherwise changed would be defined as the "width" of one or more of the pulses 478.

In FIG. 2, the term $T_t$ precisely as shown is the time between the trailing edge of the left-hand pulse 478 and the leading edge of the right-hand pulse 478.

What is claimed is:

1. A net weight fluid computer for producing an output directly proportional to the total mass flow of at least one of first and second fluids flowing as a mixture in a pipeline, said computer comprising: first means connected with the pipeline for producing first pulses at a pulse repetition frequency directly proportional to the volume rate of total flow in the pipeline; second means connected with the pipeline for producing an output directly proportional to the average density $d_m$ of the mixture in the pipeline; third means for producing an output directly proportional to the density $d_o$ of the first fluid; fourth means for producing an output directly proportional to the density $d_w$ of the second fluid; a switch having first input lead connected from said first means to receive said first pulses, said switch having at least one output lead connected therefrom, said switch having a second input lead and being electrically operable upon reciept of a pulse on said second input lead to change the connection between the first input and the output lead of said switch; and fifth means connected from said second, third and fourth means to receive the outputs thereof and adapted to impress second pulses on the second input lead of said switch to cause first pulses to be passed and interrupted alternately from the first input lead to the output lead of said switch, said fifth means causing said second pulses to have a time width $T_w$, said fifth means causing said second pulses to be generated at a rate such that the time between the trailing edge of one second pulse and the leading edge of the next succeeding second pulse is $T_t$, said fifth means causing one of said times $T_w$ and $T_t$ to be equal to the following expression $$K_1 \left( \frac{1}{d_m} - \frac{1}{d_w} \right)$$

where $K_1$ is a constant that is positive when $$d_w > d_o$$

and is negative when $$d_o > d_w,$$

said fifth means causing the other of said times $T_w$ and $T_t$ to be equal to $$K_1 \left( \frac{1}{d_o} - \frac{1}{d_m} \right),$$

said switch having pulses appearing on said output lead thereof directly proportional, in number, to the total mass flow of said one fluid.

2. The invention as defined in claim 1, wherein utilization means are connected from the output lead of said switch.

3. The invention as defined in claim 2, wherein said utilization means includes a pulse counter connected from the output lead of said switch, and an indicator to indicate the number counted by said counter, all of said means being constructed to cause said counter to read in total mass flow units.

4. The invention as defined in claim 3, wherein said second means includes a densitometer having a probe immersed in the mixture.

5. The invention as defined in claim 4, wherein said third means includes a temperature sensitive probe immersed in the mixture to vary the output of said third means in direct proportion to the temperature of the mixture.

6. The invention as defined in claim 5, wherein said first means includes a device mounted in the pipeline.

7. A net weight fluid computer for producing an output directly proportional to the total mass flow of at least one of first and second fluids flowing as a mixture in a pipeline, said computer comprising: first means connected with the pipeline for producing first pulses at a pulse repetition frequency directly proportional to the volume rate of total flow in the pipeline; second means connected with the pipeline for producing an output directly proportional to the average density $d_m$ of the mixture in the pipeline; third means for producing an output directly proportional to the density $d_o$ of the first fluid; fourth means for producing an output directly proportional to the density $d_w$ of the second fluid; a switch having first input lead connected from said first means to receive said first pulses, said switch having at least one output lead connected therefrom, said switch having a second input lead and being electrically operable upon receipt of a pulse on said second input lead to change the connection between the first input and the output lead of said switch; and fifth means connected from said second, third and fourth means to receive the outputs thereof and adapted to impress second pulses on the second input lead of said switch to cause first pulses to be passed and interrupted alternatley from the first input lead to the output lead of said switch, said fifth means causing said second pulses to have a time width $T_w$, said fifth means causing said second pulses to be generated at a rate such that the time between the trailing edge of one second pulse and the leading edge of the next succeeding second pulse is $T_t$, said fifth means causing one of said times $T_w$ and $T_t$ to be equal to the following expression $$\left(K_2\right) \left(\frac{d_o}{d_m}\right) \left(\frac{d_w - d_m}{d_w - d_o}\right)$$

where $K_2$ is a positive constant, said fifth means causing the other of said times $T_w$ and $T_t$ to be equal to the following expression $$\left(K_2\right) \left(\frac{d_w}{d_m}\right) \left(\frac{d_m - d_o}{d_w - d_o}\right),$$

said switch having pulses appearing on said output lead thereof directly proportional, in number, to the total mass flow of said one fluid.

8. The invention as defined in claim 7, wherein utilization means are connected from the output lead of said switch.

9. The invention as defined in claim 8, wherein said utilization means includes a pulse counter connected from the output lead of said switch, and an indicator to indicate the number counted by said counter, all of said means being constructed to cause said counter to read in total mass flow units.

10. The invention as defined in claim 9, wherein said second means includes a densitometer having a probe immersed in the mixture.

11. The invention as defined in claim 10, wherein said third means includes a temperature sensitive probe immersed in the mixture to vary the output of said third means in direct proportion to the temperature of the mixture.

12. The invention as defined in claim 11, wherein said first means includes a device mounted in the pipeline.

13. A net weight fluid computer for producing an output directly proportional to the total mass flow of at least one of first and second fluids flowing as a mixture in a pipeline, said computer comprising: first means connected with the pipeline for producing first pulses at a pulse repetition frequency directly proportional to the volume rate of total flow in the pipeline; second means connected with the pipeline for producing an output directly proportional to the average density $d_m$ of the mixture in the pipeline; third means for producing an output directly proportional to the density $d_o$ of the first fluid; fourth means for producing an output directly proportional to the density $d_w$ of the second fluid; a switch having first input lead connected from said first means to receive said first pulses, said switch having at least one output lead connected therefrom, said switch having a second input lead and being electrically operable upon receipt of a pulse on said second input lead to change the connection between the first input and the output lead of said switch; and fifth means connected from said second, third and fourth means to receive the outputs thereof and adapted to impress second pulses on the second input lead of said switch to cause first pulses to be passed and interrupted alternately from the first input lead to the output lead of said switch, said fifth means causing said second pulses to have a time width $T_w$, said fifth means causing said second pulses to be generated at a rate such that the time between the trailing edge of one second pulse and the leading edge of the next succeeding second pulse is $T_t$, said fifth means causing one of said times $T_w$ and $T_t$ to be equal to the following expression $$\left(K_2\right) \left(\frac{d_o}{d_m}\right) \left(\frac{d_m - d_w}{d_o - d_w}\right)$$

where $K_2$ is a positive constant, said fifth means causing the other of said times $T_w$ and $T_t$ to be equal to the following expression $$\left(K_2\right) \left(\frac{d_w}{d_m}\right) \left(\frac{d_o - d_m}{d_o - d_w}\right),$$

said switch having pulses appearing on said output lead thereof directly proportional, in number, to the total mass flow of said one fluid.

14. The invention as defined in claim 13, wherein utilization means are connected from the output lead of said switch.

15. The invention as defined in claim 14, wherein said utilization means includes a pulse counter connected from the output lead of said switch, and an indicator to indicate the number counted by said counter, all of said means being constructed to cause said counter to read in total mass flow units.

16. The invention as defined in claim 15, wherein said second means includes a densitometer having a probe immersed in the mixture.

17. The invention as defined in claim 16, wherein said third means includes a temperature sensitive probe immersed in the mixture to vary the output of said third means in direct proportion to the temperature of the mixture.

18. The invention as defined in claim 17, wherein said first means incldes a device mounted in the pipeline.

* * * * *